US010207626B2

(12) United States Patent
Eyler

(10) Patent No.: US 10,207,626 B2
(45) Date of Patent: Feb. 19, 2019

(54) EQUIPMENT DOCKING APPARATUS

(71) Applicant: Timothy Dean Eyler, Washougal, UT (US)

(72) Inventor: Timothy Dean Eyler, Washougal, UT (US)

(*) Notice: Subject to any disclaimer, the term of this patent is extended or adjusted under 35 U.S.C. 154(b) by 0 days.

(21) Appl. No.: 14/592,776

(22) Filed: Jan. 8, 2015

(65) Prior Publication Data

US 2015/0197177 A1  Jul. 16, 2015

Related U.S. Application Data

(60) Provisional application No. 61/927,384, filed on Jan. 14, 2014.

(51) Int. Cl.
*B60P 7/06* (2006.01)
*B60P 7/08* (2006.01)
*B60P 7/00* (2006.01)

(52) U.S. Cl.
CPC .............. *B60P 7/0807* (2013.01); *B60P 7/06* (2013.01); *B60P 7/08* (2013.01); *B60P 7/00* (2013.01)

(58) Field of Classification Search
CPC ........ A47B 21/0314; A47B 2021/0321; A47B 91/00; F16M 11/041; F16M 11/22; B60P 7/0807; H04M 1/04
USPC ...... 248/346.01, 346.03, 500, 346.04, 316.4; 248/176.1, 309.1, 313, 917, 918; 361/679.01, 679.09, 679.26, 679.27, 361/679.55, 679.57, 679.56
See application file for complete search history.

(56) References Cited

U.S. PATENT DOCUMENTS

| 5,790,375 | A  | * | 8/1998  | Lee ....................... G06F 1/1632 361/679.43 |
| 5,859,762 | A  | * | 1/1999  | Clark ..................... F16M 11/08 248/122.1 |
| 6,585,212 | B2 | * | 7/2003  | Carnevali ............... B60R 11/02 248/316.4 |
| 7,918,427 | B2 | * | 4/2011  | Wang ..................... F16M 13/00 248/278.1 |
| 8,074,951 | B2 | * | 12/2011 | Carnevali ............... B60R 11/02 108/143 |
| 8,091,850 | B2 | * | 1/2012  | Carnevali ................ B25B 5/02 248/176.1 |
| 8,179,672 | B2 | * | 5/2012  | Carnevali ............. G06F 1/1632 361/679.41 |
| 8,182,426 | B2 | * | 5/2012  | Zhao ....................... A61B 8/00 361/679.21 |
| 8,701,452 | B2 | * | 4/2014  | Foster ................. E05B 73/0082 248/316.1 |
| 8,780,553 | B2 | * | 7/2014  | Palmer .................. F16M 11/14 24/3.1 |

(Continued)

*Primary Examiner* — Nkeisha Smith
(74) *Attorney, Agent, or Firm* — Michael F. Krieger; Kirton McConkie

(57) ABSTRACT

Aspects of the present invention relate to systems, methods and apparatus for securing equipment to a structure. Some aspects relate to an apparatus with clamp flanges and a clamping mechanism that engages a piece of equipment and secures the equipment from tipping or other movement relative to an attached structure such as a vehicle bed, storage container or display platform. Some aspects relate to an actuating clamp arm working in conjunction with a lateral retainer spring arm to effectuate a clamping action on the equipment to be secured.

6 Claims, 4 Drawing Sheets

(56) References Cited

U.S. PATENT DOCUMENTS

| | | | |
|---|---|---|---|
| 8,821,173 B2* | 9/2014 | Carnevali | G06F 1/1632 |
| | | | 361/679.41 |
| 9,003,626 B2* | 4/2015 | Carnevali | G06F 1/1632 |
| | | | 248/316.4 |
| 9,062,820 B2* | 6/2015 | Allmendinger | F16M 11/041 |
| 9,073,450 B2* | 7/2015 | Huang | B60R 11/0252 |
| 2003/0034429 A1* | 2/2003 | Carnevali | B60R 11/02 |
| | | | 248/346.07 |
| 2007/0195079 A1* | 8/2007 | Boudewyns | B60H 1/00985 |
| | | | 345/207 |
| 2009/0189046 A1* | 7/2009 | Winsor | B60T 3/00 |
| | | | 248/346.03 |

* cited by examiner

EQUIPMENT DOCKING APPARATUS

RELATED APPLICATIONS

This application claims the benefit of U.S. Provisional Patent Application No. 61/927,384 which was filed on Jan. 14, 2014.

FIELD OF INVENTION

Embodiments of the present invention comprise apparatus for securing portable equipment such as soil compaction tampers or rammers, vibratory plates, drilling equipment and other devices that are preferably stored or transported in an upright position.

BACKGROUND

Construction site preparation, roadway construction, underground utility installation and other construction projects typically require the use, transportation and storage of portable construction equipment such as soil compaction rammers, vibratory plates, core drills and other equipment that is relatively tall, narrow and heavy, but is typically kept in an upright position where it is susceptible to tipping over. This type of equipment is preferably stored and transported in the upright position because it takes up less space and doesn't need to be manually manipulated into other positions and gasoline and other fluids do not leak out of their tanks. This type of equipment is also heavy for a single individual to manipulate and can cause severe back strain when moving from a horizontal position to the upright position.

What is needed is a compact device that can securely hold this type of equipment in an upright position during transport and/or storage.

BRIEF SUMMARY

Some embodiments of the present invention comprise an equipment docking mechanism that can be secured to a truck bed, storage container floor or display platform which can selectively engage a portion of the equipment in order to secure the equipment in a preferred position. Some embodiments may also comprise a locking apparatus to secure the equipment from theft as well. Some embodiments of the present invention may comprise clamping apparatus that engages the compaction shoe of a soil compaction rammer to secure the rammer in an upright or standing position.

BRIEF DESCRIPTION OF THE SEVERAL VIEWS OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF SOME OF THE PREFERRED EMBODIMENTS

Figure 1:
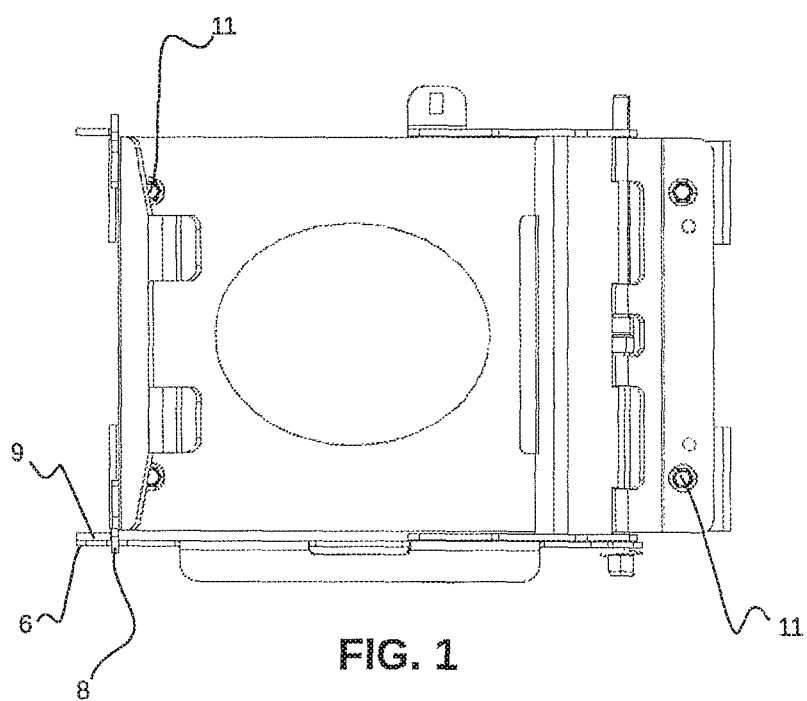
FIG. 1 is a drawing showing an exemplary embodiment of the present invention.
Figure 2:
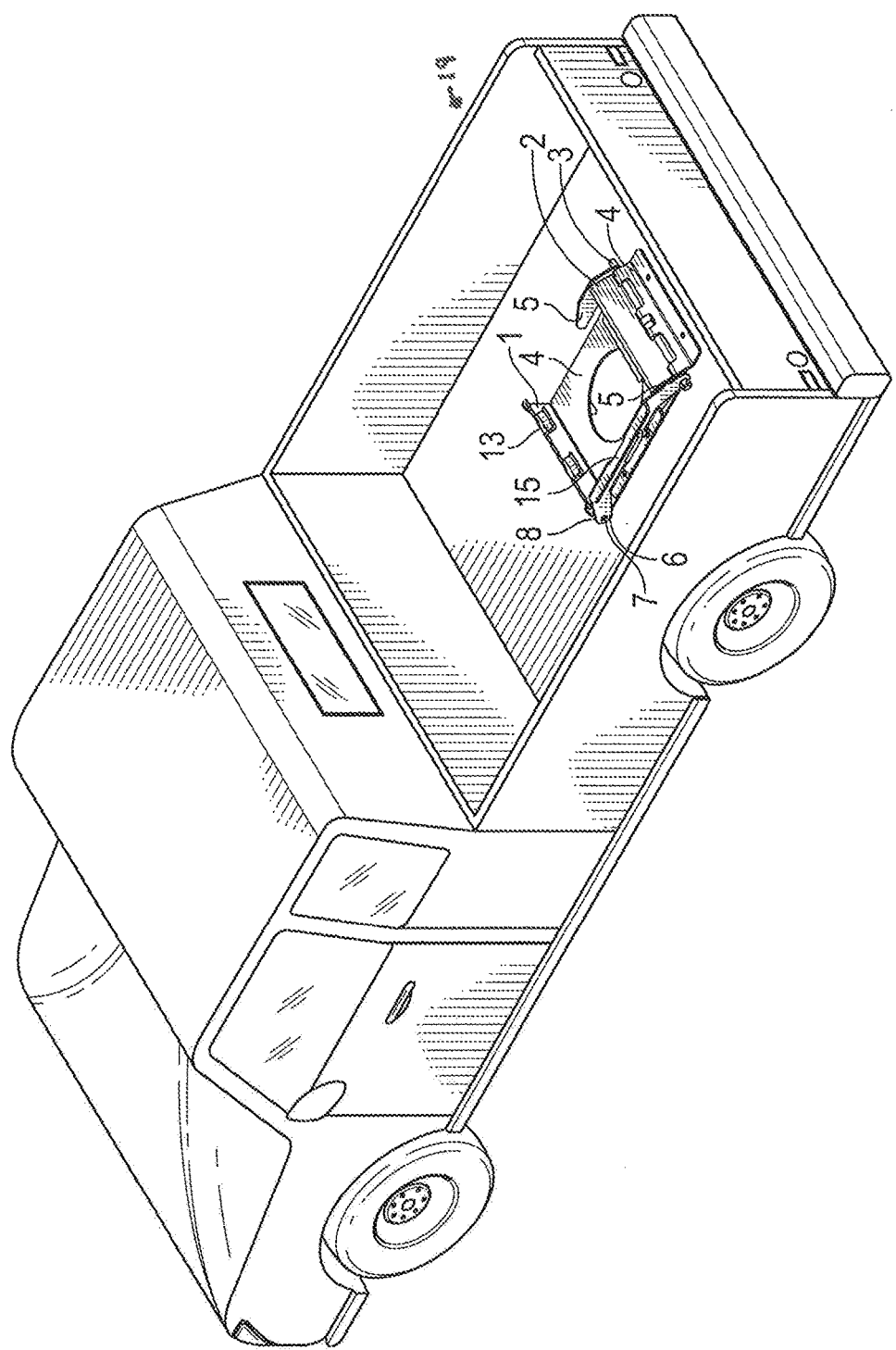
FIG. 2 is a drawing showing the base plate attached to a vehicle.
Figure 3:
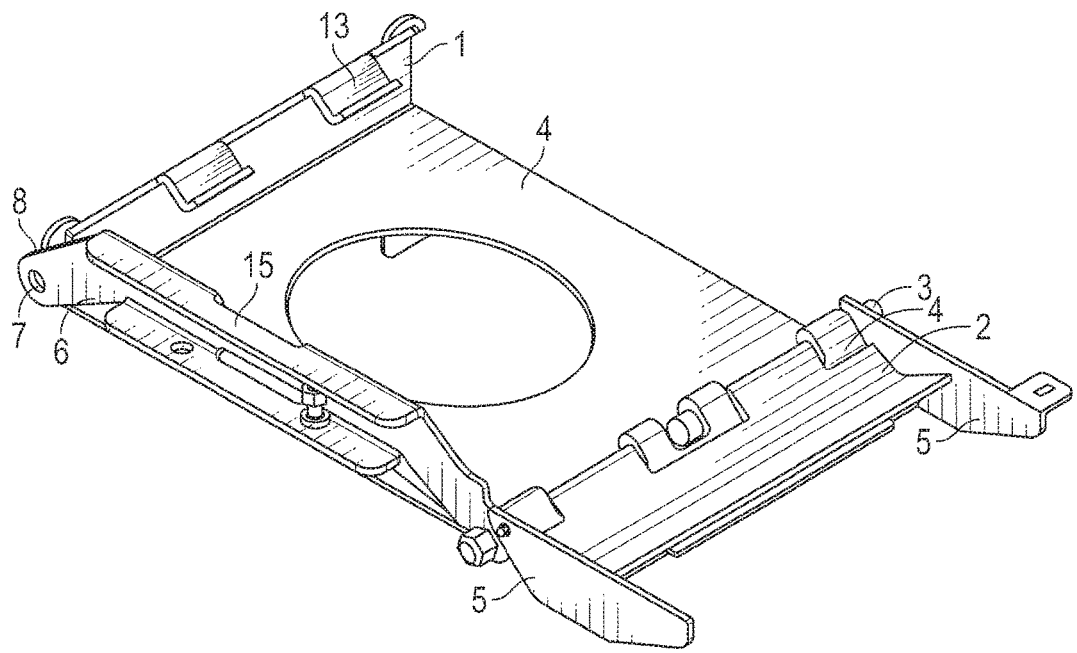
FIG. 3 shows an open position.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed descriptions of the embodiments of the methods and systems of the present invention is not intended to limit the scope of the invention but is merely representative of the presently preferred embodiments of the invention.

While exemplary embodiments revealed herein may only describe one of these forms, it is to be understood that one skilled in the art would be able to effectuate these elements in any of these forms while resting within the scope of the present invention.

Some embodiments of the present invention may comprise a stationary clamp flange fitted to conform to an equipment base portion such as a rammer compaction shoe. These embodiments further comprise a corresponding movable clamp flange fitted to conform to an opposite side of the equipment base portion. The movable clamp flange may be hinged or otherwise movable so as to engage the opposite side of the equipment base portion when placed in a closed position such that the equipment base portion is clamped between the stationary and the movable clamp flange. The movable clamp flange may be attached to a clamp arm that is used to manually open and close the clamping mechanism and to secure the clamping mechanism in a closed position where the equipment base portion is securely locked in place thereby preventing the equipment from falling over or being moved unintentionally.

Referring to FIGS. 1a-1d, some embodiments comprise a stationary clamp flange 1 configured to engage a first equipment base portion. These embodiments further comprise a movable clamp flange 2 configured to engage a second side of the equipment base portion. The second side may be opposite to the first side of the equipment base portion. The movable clamp flange 2 may also at least partially conform to the shape of second side of the equipment base portion. Movable clamp flange 2 may move between an open position that allows the equipment base portion to be freely removed from between stationary clamp flange 1 and movable clamp flange 2 and a closed position that clamps the equipment base portion between stationary clamp flange 1 and movable clamp flange 2 thereby securing the equipment in place.

In some embodiments, movable clamp flange 2 may be attached to a hinge pin 3 rotatably connected to a base plate 4. This configuration allows movable clamp flange 3 to hinge between the closed position and the open position. Hinge pin 3 may also be connected to a clamp arm 5 so that manual manipulation of the clamp arm 5 causes rotation of the hinge pin 3 and movement of the movable clamp flange 2.

In some embodiments, stationary clamp flange 1 may be connected to base plate 4, and base plate 4 may also be connected movable clamp flange 2 via hinge pin 3. Hinge pin 3 may be connected to base plate 4 with bushings or other attachment devices that allow rotation of hinge pin 3 about its axis. Base plate 4 may further comprise mounting holes, bolts and nuts 11 at various locations to allow mounting of the base plate 4 to a truck bed, storage container floor, display platform or another structure with fasteners such as bolts. In some embodiments, washers or reinforcing channels may be used between a mounting structure and the nuts to prevent pull through of the nuts under stress. In some embodiments, stationary clamp flange 1 and movable clamp flange 2 may comprise means for mounting directly to a structure without the use of base plate 4.

Some embodiments may also comprise a lateral retainer spring 15 attached to hinge pin 3 and engaging clamp arm 5 with a spring mechanism. Lateral retainer spring arm 15 is configured to prevent lateral movement of the equipment base portion in the direction of the hinge pin axis. Lateral retainer spring arm 15 serves another purpose by engaging clamp arm 5 with a spring 16, spring bolt or rod 17 and spring retainer or spring nut 18. This engagement allows movable clamp flange 2 to contact the equipment base portion and maintain compression against the equipment base portion while clamp arm 5 continues to move in order to engage catch tab 6 with catch slot 9 while compressing spring 16. Spring 16 also prevents overstressing movable clamp flange 3 or the equipment base portion. In the embodiments comprising lateral retainer spring arm 15, the lateral retainer spring arm 15 is rigidly attached to hinge pin 3 and clamp arm 5 is rotatably attached to hinge pin 3.

Lateral retainer spring arm 15 may further comprise a catch tab 6 and a lock hole 7 for securing the lateral retainer spring arm 15 in a closed position. These embodiments may further comprise a security tab 8 comprising a catch slot 9 and a lock tab hole. Catch slot 9 is configured to engage catch tab 6 when lateral retainer spring arm 15 is in a fully closed position thereby retaining lateral retainer spring arm 15 in the closed position. When lateral retainer spring arm 15 is in the closed position, lock hole 7 and a lock tab hole are aligned 20 to allow insertion of a pad lock or another locking mechanism through hole 7 to provide secure locking of lateral retainer spring arm 15 in the closed position thereby locking movable clamp flange 2 against the equipment base portion and securing the equipment in place.

Some embodiments may further comprise a second lateral retainer arm on the opposite end of hinge pin 3 from lateral retainer spring arm 15. The second Lateral retainer arm hinges with movable clamp flange 2 and lateral spring retainer arm 15 to prevent motion of the equipment base portion in the direction of the hinge pin 3 axis. When clamp arm 5 is placed in the closed position, movable clamp flange 2 will contact the equipment base portion and retain the base portion preventing movement upward from the base plate 4. At the same time, lateral retainer spring arm 15 and the second lateral retainer arm will hinge into position along opposite sides of the equipment base portion to prevent lateral motion of the base portion in the direction of the hinge pin 3 axis. When clamp arm 5 is in the open position, movable clamp flange 2, lateral retainer spring arm 15 and the second lateral retainer arm hinge away from the equipment base portion allowing it to move upward and side-to-side laterally for easy removal from the retaining apparatus.

Some embodiments may further comprise other security tabs serving the same purpose as security tab 8 with a second catch slot and lock hole for embodiments that allow clamp arm 5 to be attached on either side of the apparatus. In some embodiments, clamp arm 5 is symmetrical and interchangeable so that it can be installed on either end of the hinge pin 3 to accommodate differing location constraints.

Figure 4:
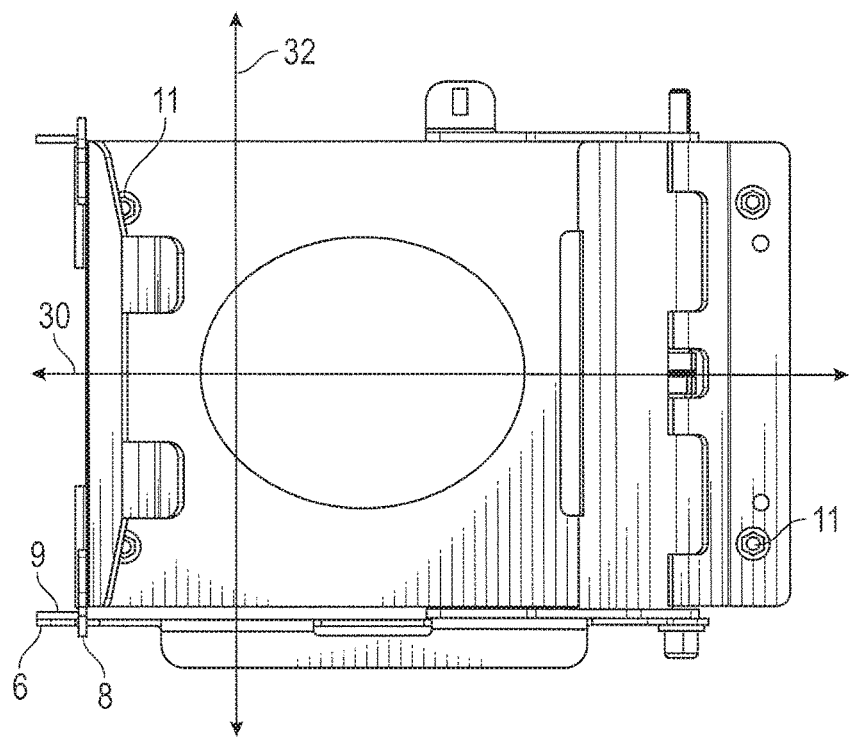
FIG. 4 shows a closed position.
Figure 5:
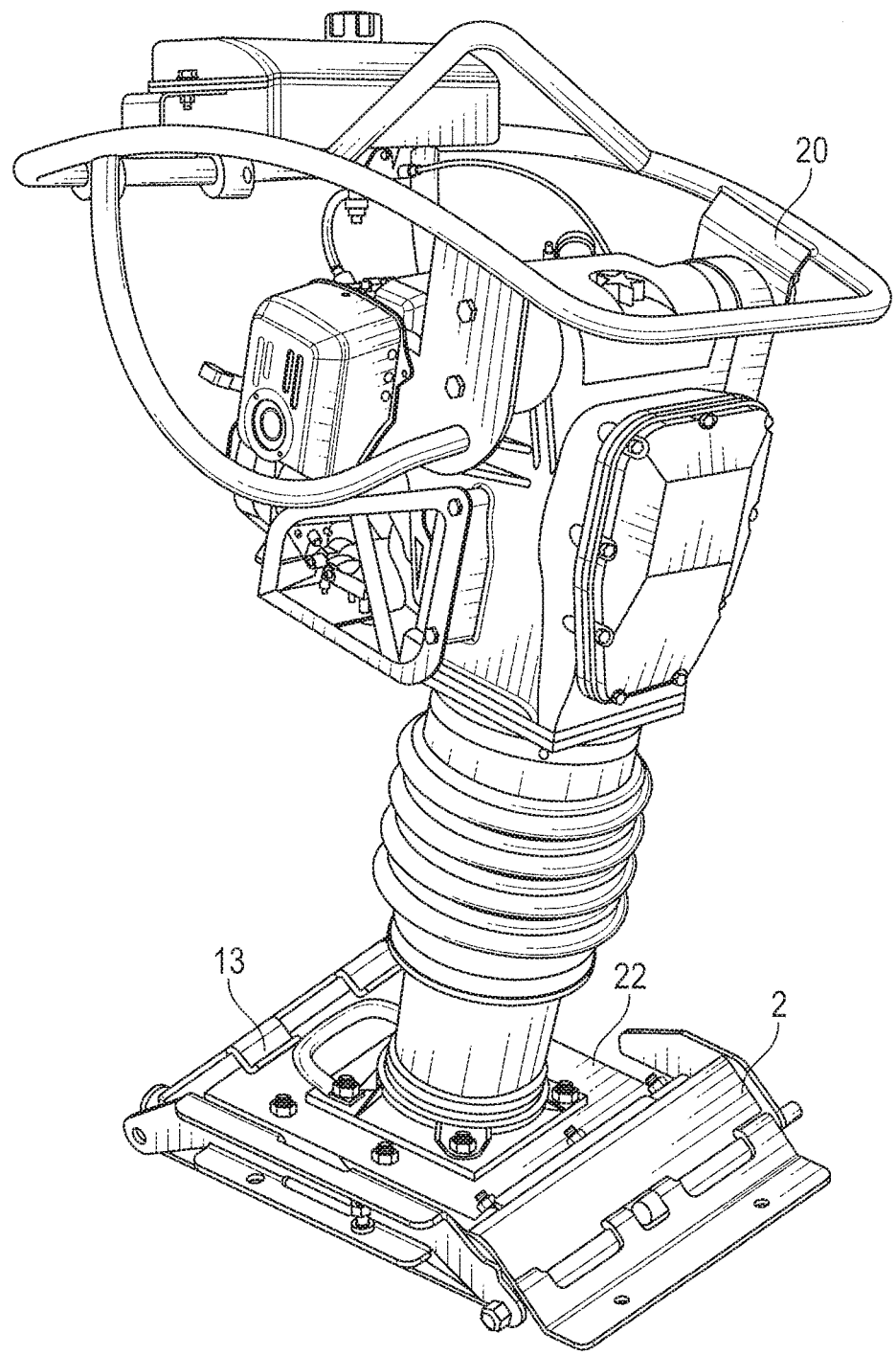
FIG. 5 shows the apparatus retaining a soil compaction rammer shoe.

Some embodiments of the present invention fully restrain motion of the equipment base in three dimensions. Stationary clamp flange 1 and movable clamp flange 2 (when closed) prevent upward motion perpendicular to the plane of the base plate 4. Stationary clamp flange 1 and movable clamp flange 2 (when closed) also prevent movement of the equipment base portion in the direction 30 perpendicular to the hinge pin 3 axis or perpendicular to the length of the hinge pin 3 (see FIG. 4). Lateral retainer spring arm 15 and an additional lateral retainer arm on the opposite side prevent motion of the equipment base portion in the direction 32 parallel with the hinge pin 3 axis or perpendicular to a line between the stationary clamp flange 1 and the movable clamp flange 2 (see FIG. 4). Accordingly, when the movable clamp flange 2 is closed against the equipment base portion, the equipment is full restrained from movement in three dimensions.

Some embodiments of the present invention may comprise flange tabs 13 extending from the stationary clamp flange 1. These flange tabs 13 may be configured to engage parts of the equipment base portion to further restrict lateral motion of the base portion. The equipment base portion may comprise protrusions, webs, bolts, flanges or other structures that may be engaged by the flange web 13.

Some embodiments of the present invention may comprise one or more electronic sensors that detect contact between movable clamp flange 2 and the equipment base portion. These sensors may be connected to a processor and alert system to alert a vehicle operator or other personnel when the movable clamp flange 2 is opened.

Some embodiments of the present invention may comprise multiple movable clamp flanges and no stationary clamp flange. In some embodiments, stationary clamp flange 1 may be replaced with a second movable clamp flange.

Some embodiments of the present invention may comprise alternative means for effectuating movement of the movable clamp flange 2. Embodiments described above comprise a hinge pin 3 and hinge mechanism, however, other mechanisms known in the art, such as mechanical linkages, chain drives, levers, gears and other mechanisms may be used. In some embodiments, hydraulic systems, electrical drive systems, pneumatic systems and other powered systems may be used to engage a movable clamp flange 2 with an equipment base portion.

Some embodiments of the present invention may be described as an apparatus for securing equipment, the apparatus comprising a first clamp flange configured to engage a first side of an equipment base portion; a second, movable clamp flange configured to engage a second side of said equipment base portion wherein said second side is opposite said first side and wherein said second movable clamp flange is further configured to move toward said first clamp flange in a clamping action that clamps said equipment base portion between said first clamp flange and said second movable clamp flange when in a closed position; a clamp arm for moving said second movable clamp flange between an open position and a closed positions; and a lateral retainer arm for preventing movement of said equipment base portion in a direction perpendicular to the direction between said first clamp flange and said second movable clamp flange. Some embodiments may further comprise a lateral retainer spring arm. In some embodiments, the movement of the movable second clamp flange toward the first clamp flange comprises rotation about an axis.

The terms and expression which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An apparatus for securing to a vehicle a soil compaction rammer, said apparatus comprising:
   a base plate, having mounting holes for securing the base plate to a vehicle, the base plate for conforming to a bottom of a shoe of a soil compaction rammer;
   a stationary clamp flange attached to the base plate for engaging a first side of the soil compaction rammer shoe;
   a movable clamp flange rotatably connected to the base plate by a hinge pin and configured to engage a second side of said soil compaction rammer shoe, wherein the second side of the soil compaction rammer shoe is opposite the first side of the soil compaction rammer shoe and wherein the movable clamp flange is further configured to move toward said stationary clamp flange in a clamping action adapted to clamp the soil compaction rammer shoe between said stationary clamp flange and said movable clamp flange when in a closed position, thereby being adapted to clamp and constrain movement of the soil compaction rammer shoe when the soil compaction rammer shoe is placed on the base plate so the soil compaction rammer will be secured;
   a clamp arm connected to the moveable clamp flange structured to leverage movement of the movable clamp flange between an open position and a closed position; and
   a lateral retainer spring arm connected to the movable clamp flange, structured to prevent movement of the soil compaction rammer shoe in a direction perpendicular to a line between the stationary clamp flange and the movable clamp flange, the lateral retainer spring arm being connected through the movable clamp flange to the lateral retainer spring arm such that the movable clamp flange is adapted to contact the soil compaction rammer shoe and retain the rammer shoe preventing movement of the rammer shoe upward from the base plate; and
   a lateral retainer spring arm hinge in a position along opposites sides of the rammer shoe to prevent lateral motion of the rammer shoe in a direction perpendicular to an axis taken along the length of the hinge pin.

2. The apparatus as described in claim 1 wherein the clamp arm further comprises a catch tab and a lock hole for securing the lateral retainer spring arm in a closed position.

3. The apparatus of claim 1, wherein the clamp arm further comprises a security tab comprising a catch slot and a lock tab hole for a padlock, and wherein the catch slot is configured to engage catch tab when the lateral retainer spring arm is in fully closed position effectively retaining the lateral retainer spring arm in the closed position.

4. The apparatus of claim 1, wherein the clamp arm is structured to align a position of a lock hole and a lock tab hole when the clamp arm is in a closed position to allow insertion of a locking device through the lock hole and lock tab hole.

5. The apparatus of claim 1, wherein the movable clamp flange, the lateral retainer spring arm and the clamp arm are structured to hinge away from the base plate allowing the soil compaction rammer shoe to move upward and side-to-side laterally for easy removal of the soil compaction rammer shoe from the apparatus when the moveable clamp flange, the lateral retainer spring arm and the clamp arm are in an open position.

6. The apparatus of claim 1, wherein the stationary clamp flange further comprises flange tabs extending from the stationary clamp flange configured to engage the soil compaction rammer shoe to further restrict lateral motion of the rammer shoe.

* * * * *